United States Patent
Chi et al.

(10) Patent No.: US 7,028,053 B2
(45) Date of Patent: Apr. 11, 2006

(54) APPARATUS AND METHODS FOR ACCESSING A COLLECTION OF CONTENT PORTIONS

(75) Inventors: Ed H. Chi, Palo Alto, CA (US); Peter L. Pirolli, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 359 days.

(21) Appl. No.: 10/248,408

(22) Filed: Jan. 16, 2003

(65) Prior Publication Data

US 2004/0143580 A1 Jul. 22, 2004

(51) Int. Cl.
*G06F 17/30* (2006.01)
*G06F 15/00* (2006.01)

(52) U.S. Cl. .................... 707/104.1; 707/1; 715/500.1; 715/501.1

(58) Field of Classification Search ................ 707/1–4, 707/6, 100–102, 200, 104.1, 500.1, 501.1; 715/500, 700
See application file for complete search history.

(56) References Cited

U.S. PATENT DOCUMENTS

| | | | |
|---|---|---|---|
| 5,442,778 A | | 8/1995 | Pedersen et al. |
| 5,483,650 A | | 1/1996 | Pedersen et al. |
| 5,619,709 A | * | 4/1997 | Caid et al. ................. 715/532 |
| 6,003,027 A | * | 12/1999 | Prager ........................... 707/5 |
| 6,564,263 B1 | * | 5/2003 | Bergman et al. ............ 709/231 |
| 2005/0160154 A1 | * | 7/2005 | Raciborski et al. ......... 709/219 |

OTHER PUBLICATIONS

Chi et al., "Using Information Scent to Model User Information Needs and Actions on the Web", *SIGCHI'01*, Mar. 31-Apr. 4, 2001.
Cutting et al., "Scatter/Gather: A Cluster-based Approach to Browsing Large Document Collections", 15th Ann Int'l SIGIR'92/Denmark-Jun. 1992.
Cutting et al., "Constant Interaction-Time Scatter/Gather Browsing of Very Large Document Collections", 16th Ann Int'l SIGIR'93/Pittsburgh PA USA-Jun. 1993.

* cited by examiner

*Primary Examiner*—Alford W. Kindred
(74) *Attorney, Agent, or Firm*—Oliff & Berridge, PLC

(57) ABSTRACT

Techniques for browsing through a large collection of content portions uses a scatter and gather approach where a collection of content portions is clustered into one or more clusters using multi-modal data modeling. Additionally, as part of the multi-modal data modeling, "proximal cues" surrounding links or connections or surrounding "image links" in a content portion are used to quickly identify the user's information needs. Thus, taking into account proximal cues during multi-modal data modeling improves the scattering and the gathering process, as well as personalizes the scattering and the gathering process to most effectively cluster content portions of interest to the user.

12 Claims, 15 Drawing Sheets

APPARATUS AND METHODS FOR ACCESSING A COLLECTION OF CONTENT PORTIONS

BACKGROUND OF THE INVENTION

1. Field of Invention

This invention relates to systems and methods for accessing a collection of content portions.

2. Description of Related Art

Increasingly, the World Wide Web has become the information delivery mechanism of choice for both corporations and individual users. The ubiquity of World Wide Web browsers and the push by many corporations to adopt commercial off-the-shelf (COTS) technology have all helped the World Wide Web become the delivery option for most information systems.

Although information sources are now more likely to be available to their intended audience through the World Wide Web, access to relevant information is still limited by the user's ability to navigate both the World Wide Web and the destination websites themselves to actively retrieve the required information.

Many website designers design a website which is suited for the information to be conveyed by the website. For example, a website designer of a county government tax assessors office site may assume that any query would be related to county tax assessment. In contrast, the website designer for an online department store would design a website that would provide a user with access to product information of products that are available at the store. Likewise, the website designer of an internal corporate information site would provide information such as corporate tax information, real estate holdings, business permits and/or health and safety records. Accordingly, certain tasks would be better addressed by one website when compared with another website and certain information needs would be satisfied by one website rather than another website.

Usually, it is not easy for a user to initially formulate a query so precise that the user is immediately able to accurately find the required information contained in the websites. For example, the user may not be familiar with the terms used in describing the information. In many instances, the user has only a general understanding of the information. Therefore, in a typical search, the user may initially perform a browsing session that broadly uncovers information in a general manner. As the user becomes familiar with the range of topics available and the terms related to the information, the user refines the browsing session to obtain topics which are more closely related to the user's needs. Once the user is satisfied, the user may then perform specific searches on the results of such a refocused search that would lead to the required information.

SUMMARY OF INVENTION

This invention provides systems and methods for browsing a collection of content portions using proximal cue information.

This invention provides systems and methods for browsing a collection of content portions using user behavior.

This invention provides systems and methods for browsing a collection of content portions that is adaptively tailored to user information needs and/or tasks.

This invention provides systems and methods for browsing a collection of documents that is dynamically re-tailored to user information needs and/or tasks.

This invention provides systems and methods that provides an interface to a collection of content portions.

In various exemplary embodiments, multi-modal information and proximal information are determined for at least one content portion in a collection of content portions. In various exemplary embodiments, the proximal information includes information based on one or more images in a content portion. In various exemplary embodiments, at least one cluster center is generated for clustering content portions. In various exemplary embodiments, a content portion is clustered to a cluster center having similar multi-modal information and proximal information.

In various exemplary embodiments, content portions of at least one selected cluster are retained and content portions of a non-selected cluster are purged. In various exemplary embodiments, when content portions of at least two clusters are selected, the selected clusters are merged.

In various exemplary embodiments, at least one user access path through the collection of content portions is determined. An access path is a path that a user looks along in accessing linked content portions by judging from one content portion forward or backward to another linked content portion. At least one content portion associated with the user access path is determined. In various exemplary embodiments, the content portion associated with the user access path is used as a basis for clustering.

In various exemplary embodiments, a vector based on the multi-modal information and the proximal information of the content portion is generated. The generated vector is used as basis for determining similarity between content portions.

In various exemplary embodiments, a vector based on the multi-modal information and the proximal information of content portions of the accessed content portions lying along the user access path is generated. The vector is used as basis for determining similarity between user paths.

In various exemplary embodiments, a summary is generated for at least one generated cluster.

These and other features and advantages of this invention are described in, or are apparent from, the following detailed description of various exemplary embodiments of the systems and methods according to this invention.

BRIEF DESCRIPTION OF DRAWINGS

Various exemplary embodiments of this invention will be described in detail, with references to the following figures, wherein.

FIG. 14 is a block diagram that shows in greater detail one exemplary embodiment of the content portion determining circuit, routine or application of FIG. 12 according to this invention and.

DETAILED DESCRIPTION

A known technique for browsing through a large collection of content portions uses a scatter and gather approach, such as that disclosed in U.S. Pat. No. 5,442,778 to Peterson et al. In the scatter and gather approach described in the 778 patent, a collection of content portions is clustered into one or more clusters based on similarity of words between content portions. In various exemplary embodiments, each content portion is represented by words contained in the content portion. The clustering is based on an assumption that mutually similar content portions will tend to be relevant to the same queries. A summary is generated for each cluster. The user is then presented with the clusters for selection. Once one or more clusters have been selected, the selected clusters are gathered to form a subcollection. The scatter and gather approach then reclusters or scatters the subcollection into one or more new clusters based on similarity of words. The set of clusters is again presented to the user for selection. With each successive iteration, the number of content portions decreases and the user is presented with a more detailed group of clusters of content portions that are relevant to the user's information needs. Further, when scattering the content portions into clusters, the known technique may also cluster the content portions based on the frequencies of words that occur in a content portion. However, the known technique does not take into account browsing a collection of content portions based on user modeling or user profiles. Further, the known technique does not take into account multi-modal data modeling.

User modeling or user profiles contextualize and personalize a collection of content portions based on user information goals. The user information goals can be obtained, for example, from user traces or access paths in a network. Further, a more effective browsing technique is achieved by using multi-modal data modeling. Additionally, as part of the multi-modal data modeling, "proximal cues", i.e., surrounding links or connections, including surrounding "image links" in a content portion, are used to quickly identify the user's information needs. Proximal cues can be words or text that surround a link, a connection or an image link in a content portion and that convey information to a user when deciding which access path in the network to take. Thus, taking into account proximal cues during multi-modal data modeling in the user modeling or in the user profiles improves the scattering and gathering process, as well as personalizes the scattering and gathering process to most effectively cluster content portions of interest to the user. Details for determining proximal cues associated with links, including image links, that can be used for multi-modal data modeling are described below.

Figure 1:
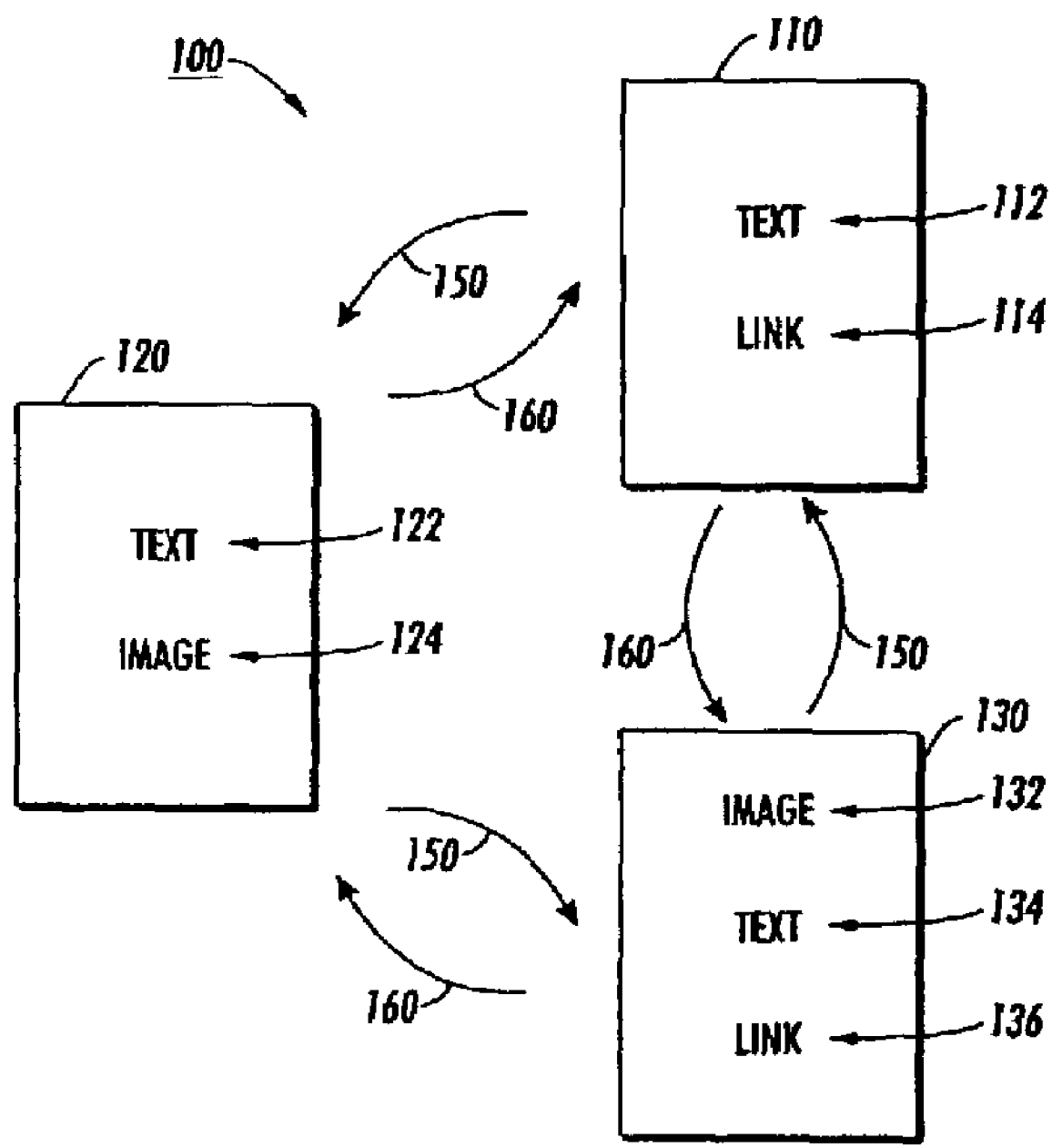
FIG. 1 illustrates a plurality of content portions, in a collection of content portions, that are connected by links.

FIG. 1 illustrates a collection 100 of content portions 110, 120 and 130 connected together by connections 150 and 160. Each of the content portions 110, 120 and 130 may be a web page, a document file, an image file, a sound file, a multi-modal file containing two or more of text, images, sounds and the like, or any other known or later-developed electronically accessible structure that contains information. For the purposes of illustration, only three content portions are shown in FIG. 1. However, the number of content portions may vary, dependent on the collection 100 that is being accessed, by any number.

In the exemplary embodiment of FIG. 1, the content portions 110, 120 and 130 may be web pages or documents accessible through the Internet. Each content portion 110, 120 and 130 may contain one or more content elements that may be of interest to a user. For example, as shown in FIG. 1, the content portion 110 contains a text 112 and a link 114. The link 114, when selected, connects the user to another content portion, for example, to the content portion 120 over the connection 150. The content portion 120 contains a text element 122 and an image element 124. The image 124 is an "image link" having a pictorial representation of one or more content elements in another content portion, for example, the content portion 130. The image element 124, when selected, connects the user to the content portion 130 over the connection 150. The content portion 130 contains an image element 132, a text element 134 and a link 136. Relative to a given content portion, a link that connects the user to another content portion is defined as an "outlink". On the other hand, relative to that given content portion, a link in another content portion that connects the user to this given content portion is defined as an "inlink".

Figure 2:
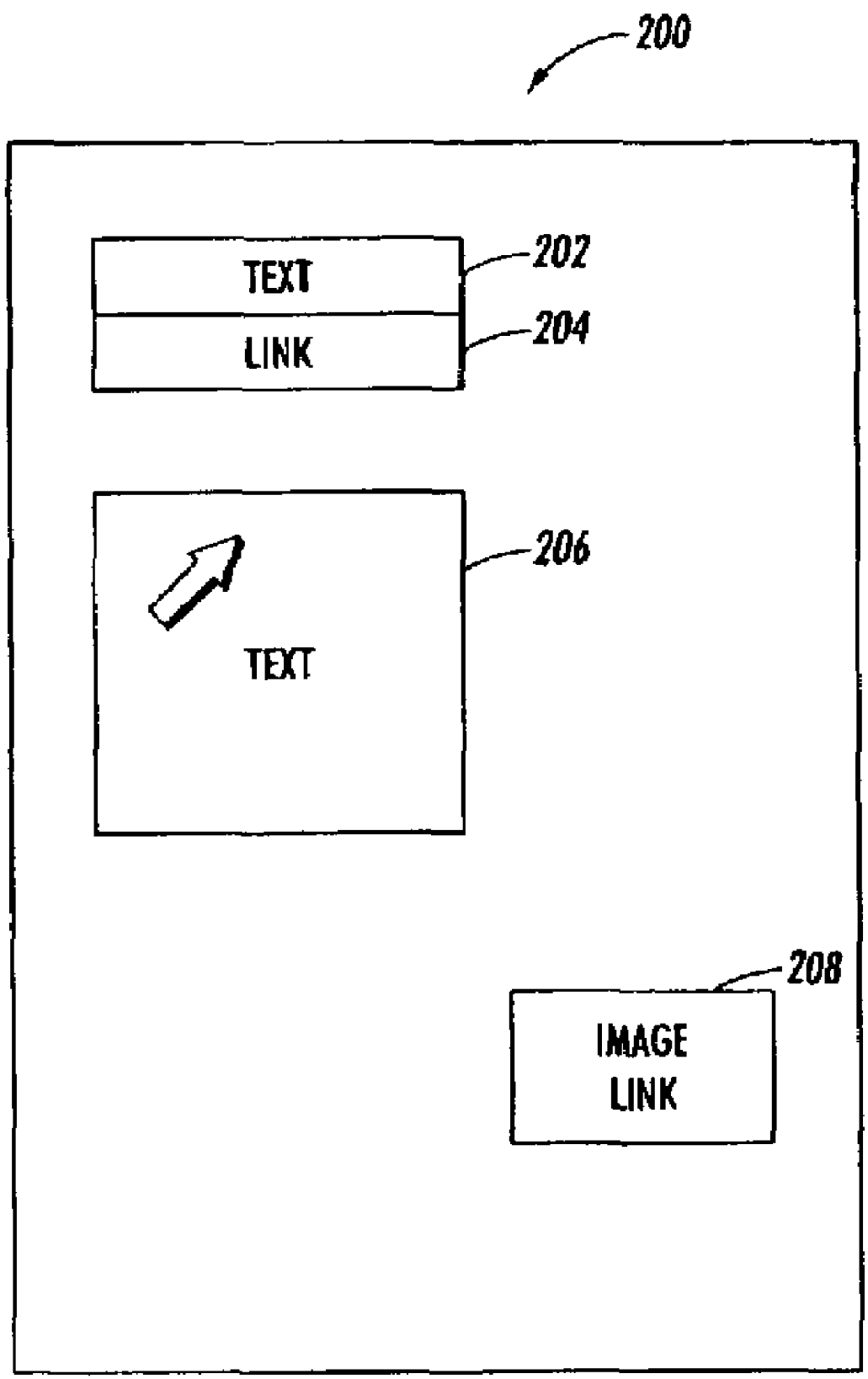
FIG. 2 illustrates a link and proximal terms in a typical content portion.

FIG. 2 illustrates a typical content portion 200 having a link 204, an image link 208, and text elements 202 and 206. In the content portion 200, proximal cues may be content elements, such as image(s), word(s) or text strings, that convey information about a link to a user. For example, proximal cues may be portions of the text element 202 surrounding the link 204. Thus, if the text element 202 says "Buy a gift certificate", then the words "buy", "a", "gift", and "certificate"serve as proximal cues that convey information about the link 204. If the link 204, in addition, has another text element 206 near it that says "click here to purchase gift certificates that are discounted", this text element 206 is also a proximal cue that conveys information about the link 204. If the link 204 is in typical Uniform Resource Locator (URL) form, for example, "www.xerox.com/products/support/index.html", the words "www", "xerox", "com", "products", "support" and "index" serve as proximal cues for the link 204. It should be appreciated that the present invention is not limited to using Uniform Resource Locators, but can use known or future technologies for addressing or locating content portions.

Unlike the link 204, the proximal cues of the image link 208 may be the pictorial representation of the image link 208 itself. The use of image links will increase as web site developers attempt to improve the navigability of their web sites. Accordingly, it is desirable to determine proximal cues associated with image links. Various strategies may be used to determine the proximal cues that describe an image link. In one strategy, the image may be analyzed using known image recognition techniques. However, presently, a large increase in processing time and required resources will result. In another strategy, the proximal cues may be derived from information surrounding the image link 208. For example, referring back to FIG. 1, if the image element 124 is an image link, then any text strings or words surrounding the image element 124 may be analyzed. Further, the distal content portion 130 that is linked to the image element 124 can be retrieved and analyzed for proximal cues. Consequently, the content portion 130 serves as a proxy to supplement or replace any proximal cue information in the content portion 120 containing the image 124 that is insufficient or unavailable. In various exemplary embodiments, the text strings, words or title in the distal content portion may serve as proximal cues to link the image elements.

Figure 3:
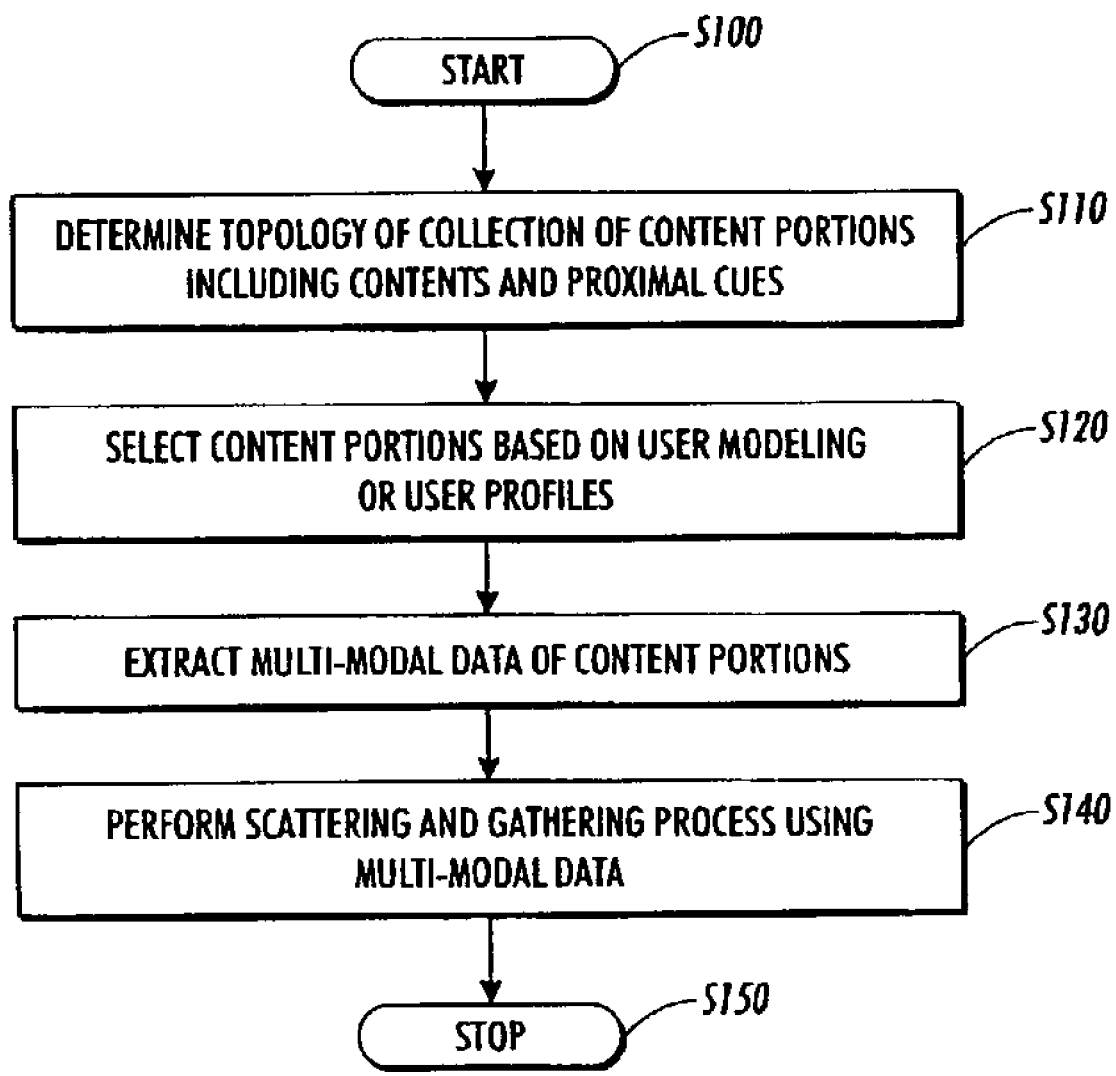
FIG. 3 is a flowchart outlining one exemplary embodiment of a method for browsing according to this invention.

FIG. 3 is a flowchart outlining one exemplary embodiment of a method for browsing through a collection of content portions according to this invention. In this exemplary embodiment, operation of the method starts in step S100, and continues to step S110, where a topology of a collection of content portions, including links or connections, content elements and proximal cues associated with links or connections of content portions, is determined. Next, in step S120, one or more content portions are selected based on user modeling or user profiles. Then, in step S130, the multi-modal data of the content portions are extracted for the scattering and gathering process. Next, in step S140, browsing based on the scattering and gathering process is performed on the content portions based multi-modal data modeling. Once, the scattering and gathering process is completed, operation continues to step S150, where the method terminates.

Figure 4:
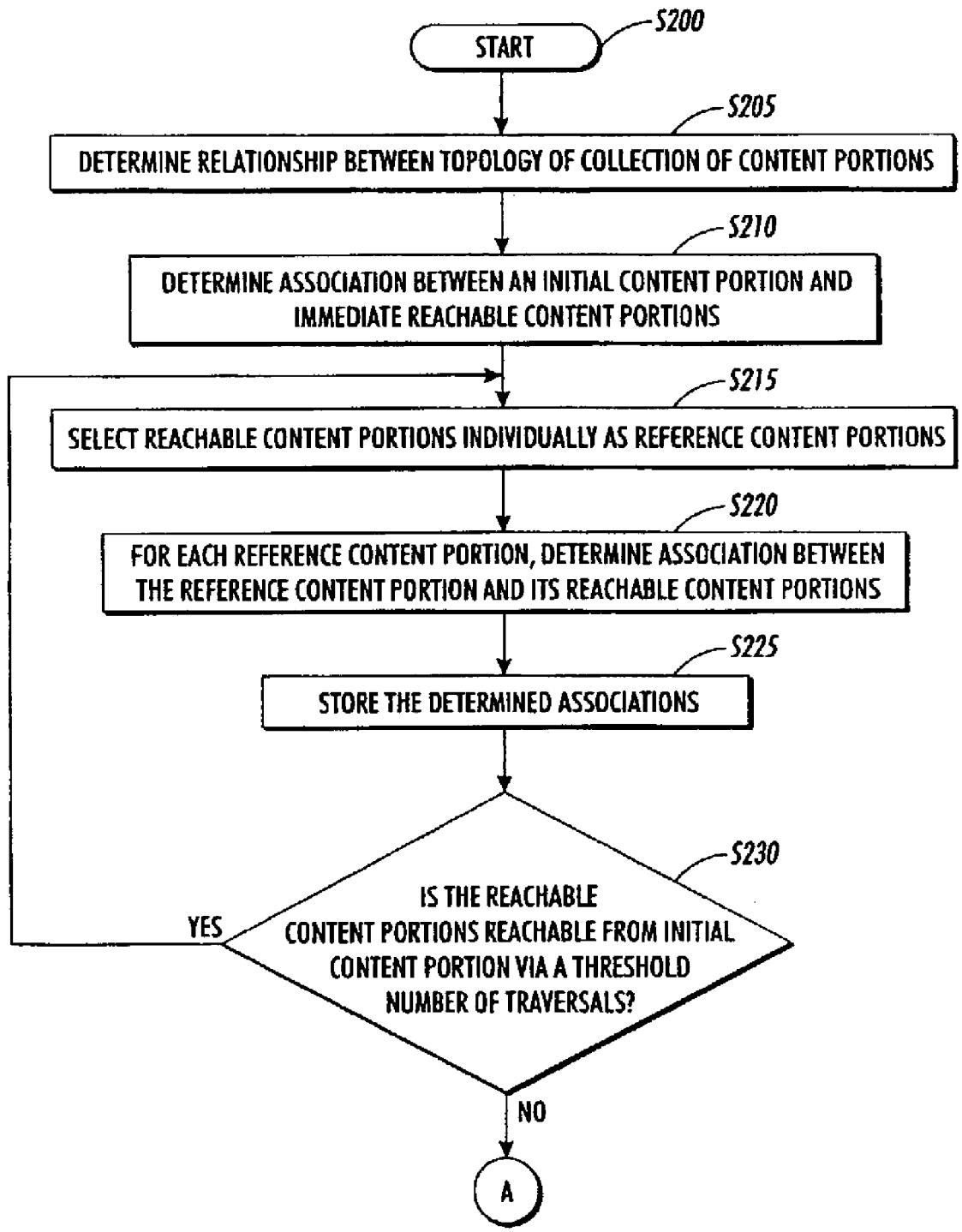
FIGS. 4 and 5 are a flowchart outlining one exemplary embodiment of a method for determining contents, links, connections and/or proximal cue information of content portions according to this invention.
Figure 5:
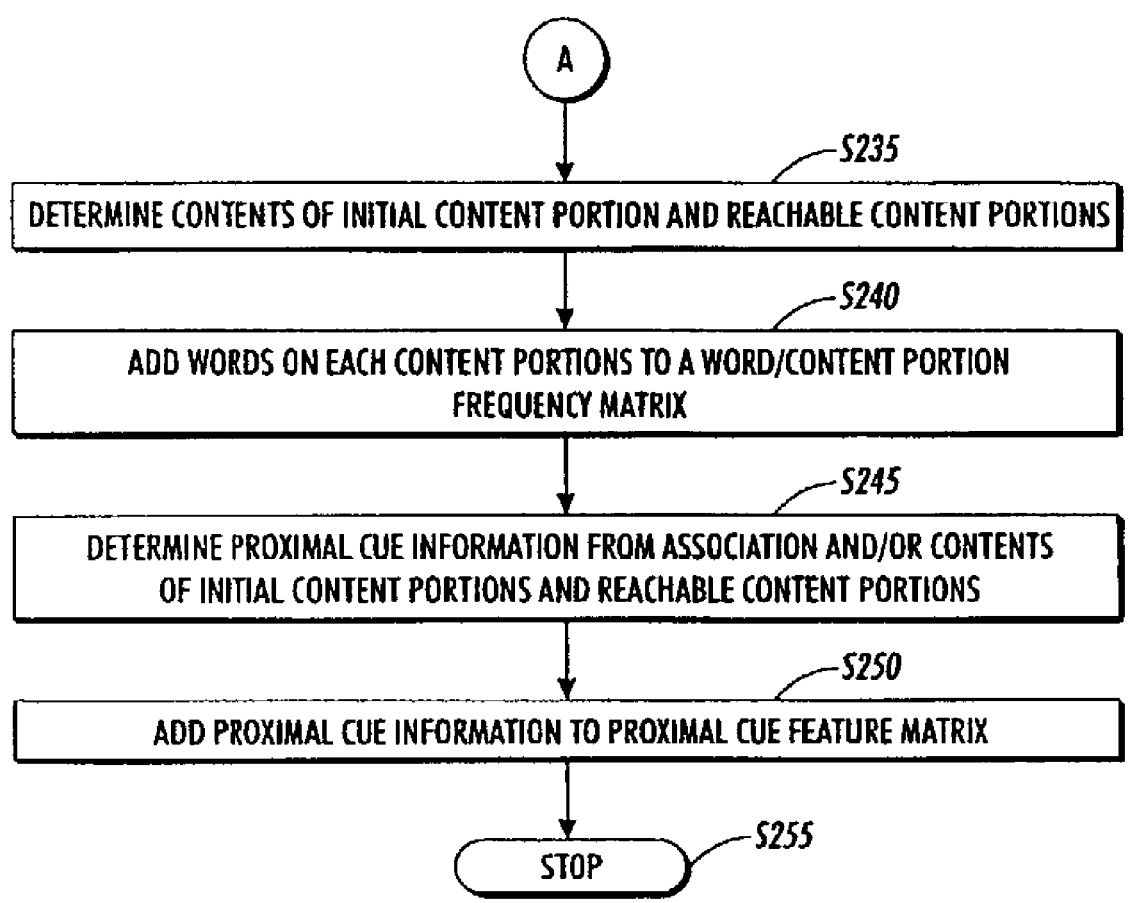

FIGS. 4 and 5 are a flowchart outlining one exemplary embodiment of a method for determining the topology of the collection of content portions, connections or links and contents including proximal cues of content portions of step S110 according to this invention. As shown in FIGS. 4 and 5, in this exemplary embodiment, operation of the method starts in step S200, and continues to step S205, where the relationships between the content portions of a collection of content portions are determined. The relationships may be determined by traversing the collection of content portions, and identifying connections and/or links, including image links. In various exemplary embodiments, associations between content portions are identified. Operation then continues to step S210.

In step S210, associations between an initial reference content portion and any content portions immediately reachable from the initial reference content portion are determined and stored in a topology data structure. It should be appreciated that a topology data structure may include a topology matrix, a topology adjacency list or any other known or later-developed technique of storing topology information about the content portions. Then, in step S215, each reachable content portion is selected individually as a next reference content portion. Next, in step S220, for each reference content portion, associations between that reference content portion and any immediately reachable content portions are determined. Operation then continues to step S225.

In step S225, the associations are stored in the topology data structure. In various exemplary embodiments, continual looping may be avoided by maintaining a list of reference content portions already visited. Then in step S230, a determination is made whether all reachable content portions reachable from the initial reference content portion via a determined number of link/connection traversals have been identified. If not, the operation returns to step S215. Otherwise, operation continues to step S235.

In step S235, the contents of initial and each of the reachable content portions are determined. Next, in step S240, the words within each content portion are added to a word/content portion frequency matrix. In various exemplary embodiments, in step S240, weights for each of the words are determined and a weighted word content portion frequency matrix is created. Then, in step S245, connections or links, including any image links, identified in steps S205 to S240 and the content portions are analyzed for proximal cues. Operation then continues to step S250.

In step S250, the proximal cues are added as proximal cue feature vectors to a proximal cue feature vector matrix. The proximal cue feature vector matrix stores information about which proximal cue feature vectors are associated with which links and/or content portions. In various exemplary embodiments, the vectors in the proximal cue feature vector matrix may be weighted. Operation then continues to step S255, where the process terminates.

Figure 6:
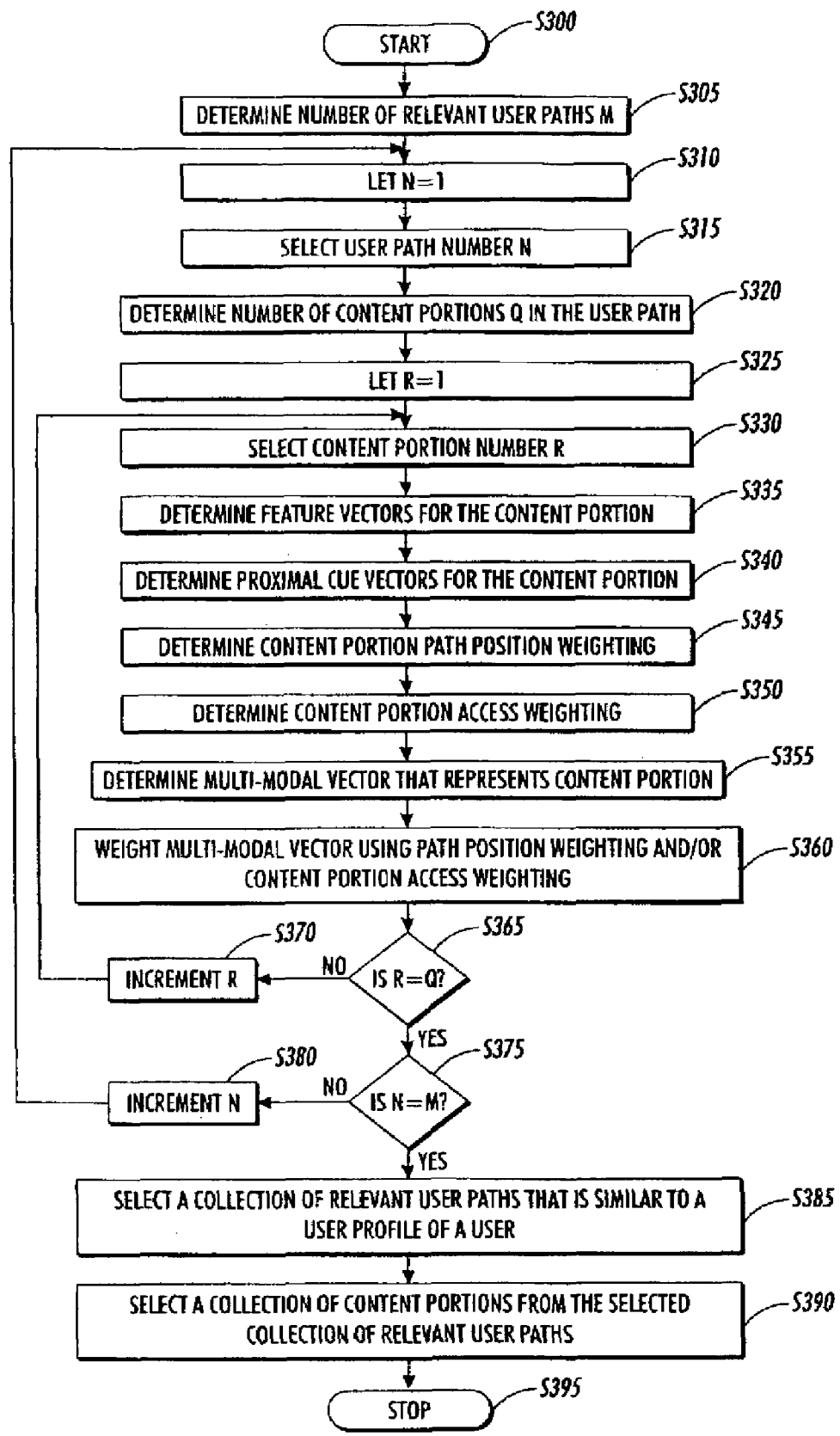
FIG. 6 is a flowchart outlining one exemplary embodiment of a method for determining multi-modal information including proximal cue information of accessed content portions lying along a user access path according to this invention.

FIG. 6 is a flowchart outlining one exemplary embodiment of a method for selecting content portions to be used in the scattering and gathering process based on user modeling of step S130 according to this invention. As shown in FIG. 6, in this exemplary embodiment, operation of the method starts in step S300 and continues to step S305, where one or more relevant user paths are determined. In various exemplary embodiments, the relevant user paths are determined by using the longest repeating subsequence technique. For example, a longest repeating subsequence of content portions can be a sequence of consecutive content portions accessed by a user, where each content portion appears at least some number of times that is greater than a threshold level, and/or the sequence appears at least twice. Then, in step S310, once the one or more relevant user paths M have been identified, a counter N is set to one. Next, in step S315, a first user path is selected. Operation then continues to step S320.

In step S320, the number of content portions Q for the selected user path is determined. Next, in step S325, a second counter R is set to one. Then, in step S330, a first content portion is selected as a current content portion. Operation then continues to step S335.

In step S335, one or more feature vectors for the selected content portion are determined. In various exemplary embodiments, the one or more feature vectors include one or more of a content feature vector, a uniform resource locator feature vector, an inlink feature vector and an outlink feature vector, among others. Next, in step S340, the proximal cue vector associated with the current content portion is determined. Then, in step S345, a content portion path position weighting for the current content portion is determined. The path position weighting may, for example, adjust the weighting to provide a greater weighting for content portion information that appears later in the path under the assumption that information accessed farther along a path more closely reflects the user's information needs. Operation then continues to step S350.

In step S350, a content portion access weighting for the current content portion is determined. In various exemplary embodiments, the content portion access weighting may be determined by analyzing usage information, such as a document server, electronic library log file or web server access information, to determine how many times each content portion has been accessed. In various exemplary embodiments, weighting function is developed based on this information. Then, in step S355, one or more of the proximal cue feature vector, the content feature vector, the uniform resource locator feature vector, the inlink feature vector and/or the outlink feature vector for the current content portion are concatenated to form a single multi-modal vector that represents the current content portion. Next, in step S360, the multi-modal vector is weighted using the content portion path position and/or the content portion access weighting. Operation then continues to step S365.

In step 5365, a determination is made whether the counter R has reached the maximum number of content portions Q in the user path. If the counter R has not reached the maximum number, then operation continues to step S370. Otherwise, operation jumps to step S375.

In step S370, the counter R is incremented. Operation then returns to step S330. In contrast, in step S375, a determination is made whether the counter N has reached the maximum number of user paths M. If the counter N has not reached the maximum number M, then operation continues to step S380. Otherwise, operation continues to step S385. In step S380, the counter N is incremented. Operation then returns to step S315. In step S385, a collection of relevant user paths (that is, user profiles) is selected that is similar to a user profile of a user. Then, in step S390, a collection of content portions from the collection of user profiles are gathered for the scattering and gathering process. The operation of the method continues to step S395, where the operation terminates.

It should be appreciated that after step S385, user profiles for each relevant user path has been constructed. Thus, these user profiles are used to select content portions for the scattering and gathering process. A user using the scattering and gathering process would have their own user profile. This user profile may be generated on-the-fly based on the user's surfing history, past interaction history or specified explicitly, for example. The user's user profile is compared with other user profiles. A collection of user profiles that are similar to the user user's profile is gathered. The collection of content portions used to perform the scattering and the gathering is selected from the collection of user profiles. Thus, a similarity comparison of the user profiles with each of the content portions is performed. If the similarity of a content portion is within some threshold, the content portion is selected.

Figure 7:
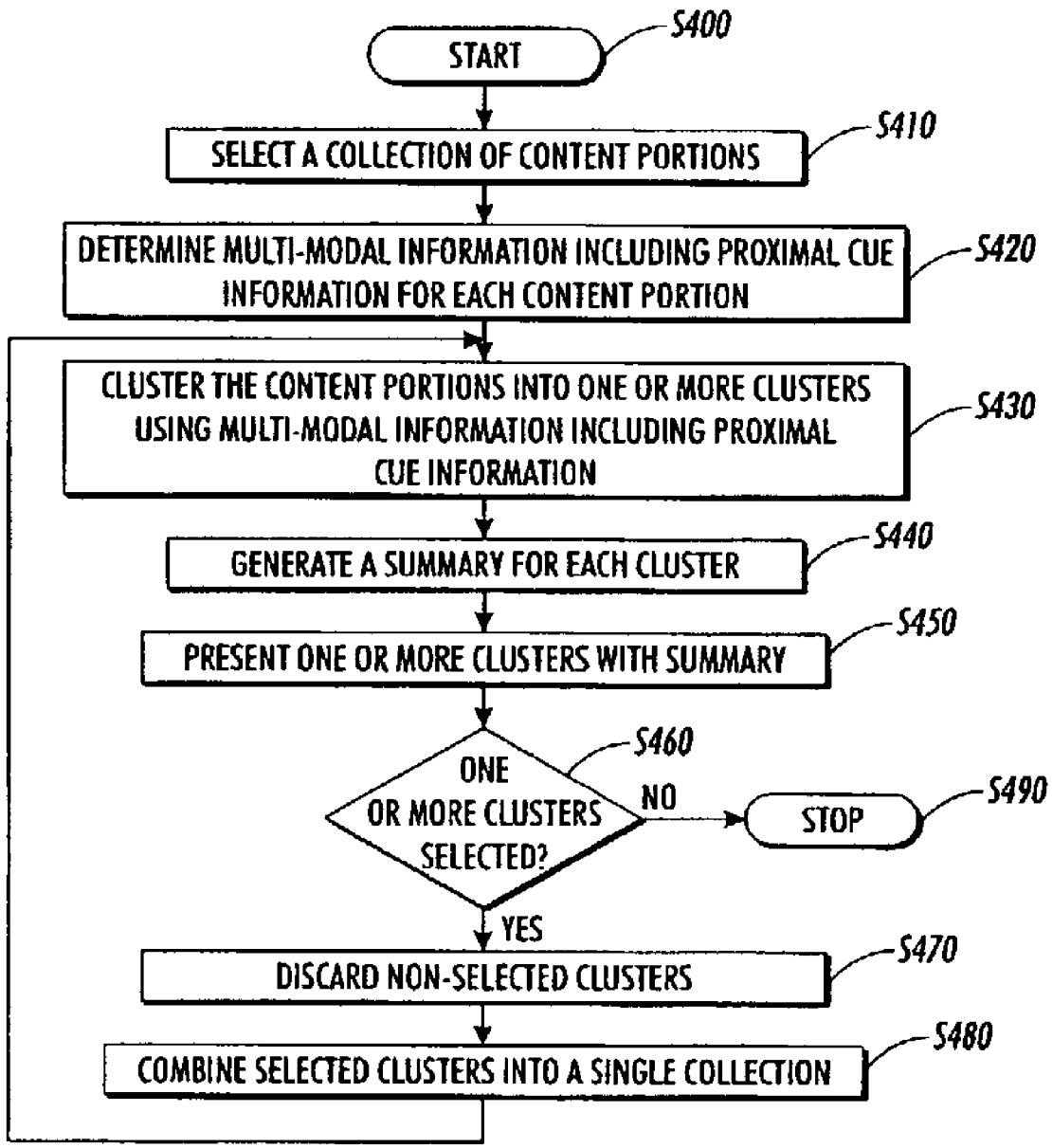
FIG. 7 is a flowchart outlining one exemplary embodiment of a method for scattering and gathering clusters of content portions according to the invention, where each content portion is represented by multi-modal information including proximal cue information according to the invention.

FIG. 7 is a flowchart outlining one exemplary embodiment of a method for scattering and gathering clusters of content portions of step S140 according to this invention. As shown in FIG. 7, operation of the method starts in step S400 and continues to step S410, where in this exemplary embodiment, a collection of content portions are selected. Then, in step S420, the multi-modal information, including the proximal cue information, for each content portion is determined. Next, in step S430, the content portions are clustered into one or more clusters based on the multi-modal information, including the proximal cue information, using one or more clustering techniques. Operation then continues to step S440.

In step S440, for each cluster, a summary is generated that is representative of that cluster. Next, in step S450, the summary of each cluster is presented to the user so that one or more clusters can be selected based on the summary of the cluster. Then, in step S460, a determination is made whether one or more clusters have been selected by the user. If one or more clusters have been selected by the user, operation continues to step S470. Otherwise, operation jumps to step S490.

In step S470, the one or more non-selected clusters are discarded. Then, in step S480, the selected one or more clusters are gathered, that is, combined, into one collection. Operation then returns to step S430. In contrast, in step S490, operation of the method terminates. It should be further appreciated that the scatter-gather method for browsing a collection of content portions is described in greater detail in the incorporated 778 patent.

In various exemplary embodiments, summaries may be determined for each cluster using a commercially available summarization engine. Selected images from a cluster may be also pieced together to form a collage. These features are further described in Helfman, J. I., "Image Representations for Access and Similarity-Based Organization of Web Information", PhD Dissertation, University of New Mexico, Computer Science Department, July 1999, which is incorporated herein by reference in its entirety.

In various exemplary embodiments, the weighting performed in, for example, in steps S350 and/or S360 can be accomplished according to any known or later-developed weighting technique. For example, Term Frequency by Inverse Document Frequency (TF.IDF) weighting may be used. Term Frequency by Inverse Document Frequency is an information retrieval technique that calculates term importance of a word by weighting the word based on how frequently it occurs in the document collection or web site. Further information on Term Frequency by Inverse Document Frequency is found in H. Schuetz, et al., "Foundations of Statistical Natural Language Processing,", MIT Press, Cambridge, Mass., 1999.

In various exemplary embodiments, the topology matrix data structure may be developed automatically. In various exemplary embodiments, the information for the topology matrix data structure may be supplied by any other tool or utility, such a web crawler. Alternatively, the information may be provided by the web site designer. The topology matrix represents the content portions that can be reached, for example, from an initial starting content portion.

In various exemplary embodiments, proximal cue words include, for example, the text of the link structure. For links including characters such as "/" and ".", these characters may be used as word boundary markers. The text is added to the list of proximal cue words. Text surrounding the link structure, the title of the proximal page and/or features, such as where the link is found within the document, may also be analyzed for proximal cue words. It will be apparent that any feature of the proximal content portion may be used to provide or define proximal cue words. If the link structure is an image, proximal cue words surrounding a link frequently provide some cue words. In various exemplary embodiments, proximal cue words for the image are determined from text surrounding the link, the title of the content portion containing the image, image filename and/or the like.

In various exemplary embodiments, the user paths may be determined, for example, by analyzing the document server or web server access information. The document server or web server access information indicates the connected to, or linked to, content portion which a user has used to traverse into the collection, the connected to, or linked to, content portion, the date and the time as well as machine address information. Information about the type and/or version of the user's browser may also be recorded.

In various exemplary embodiments, when a user views a content portion, such as a document or a web page, of the content portion collection, such as a document collection or a web site, through a document or web server, the user's machine identification information, "referred by document", "referred to document", browser type and date and time are saved in the document server or web server access information. As the user traverses the site from an initial entry page, a user path is generated in the access information. The path is identified by the machine identification information and indicates the previous document or web page and current document or web page in the "referred by document field" and the "referred to document field" of the document server or web server access information.

In various exemplary embodiments, the value of a given position in the information need keyword vector indicates how relevant the associated keyword is to the user path. For an exemplary vector B having the following six dimensions, [1 2 5 99 1 50], the vector positions 4 and 6 represent the two most relevant keywords. These vector positions might represent, for example, "chocolate" and "souflee".

In various exemplary embodiments, the Uniform Resource Locators (URLs) are broken into constituent words and the words are weighted according to frequency. For example, a Uniform Resource Locator such as "www.xerox.com/index.html" is broken up into the words "www", "xerox", "com", "index" and "html". A vector describing the weighted presence of the words appearing in the Uniform Resource Locators is determined.

In various exemplary embodiments, the machine address information can be used to provide an indication of the path of users between the content portions identified in the document server, or in the web server access information. The user path information may be further analyzed using the techniques described in Pitkow et al., "Mining Longest Repeating Sub-sequences To Predict World Wide Web Surfing", in Proceedings of USITS' 99; The $2^{nd}$ USENIX Symposium on Internet Technologies and Systems, USENIX Association, 1999; and Pirolli et al. "Distributions of Surfers' Paths Through the World Wide Web: Empirical Characterization", World Wide Web 2(1–2):29–45, each incorporated herein by reference in its entirety.

In various exemplary embodiments, a content feature vector reflects the content of the words contained by each content portion in the path. In various exemplary embodiments, a Uniform Resource Locator feature vector reflects words within the Uniform Resource Locators contained by each content portion. The "/"and "." contained within Uniform Resource Locators are used to define word boundaries. In this way, the word content of the Uniform Resource Locators may be determined.

In various exemplary embodiments, an inlinks multimodal feature vector indicates the inward connections or inlinks into each of the content portions along the selected user path. The inward connections or inlinks are determined for example, by examining the topology data structure of the collection of content portions and by identifying which content portions have entries indicating a link into the selected content portions along the selected user path. Similarly, an outlinks feature vector indicates outward connections or outlinks for each content portion along the selected user path. It will be apparent that any other set of known or later-developed features of a content portion may be used to determine feature vectors.

In various exemplary embodiments, a mathematical function assigning asymptotically greater weight to information appearing later along the path or any other known or later-developed technique may be used to provide path position weighting according to this invention.

In various exemplary embodiments, a content portion weighting function might lower the weighting associated with a content portion that is accessed by every user path, under the assumption that the content portion is a splash screen or entry content portion, or the like, that every user of the site must visit to start the user path traversal.

In various exemplary embodiments, the proximal cue feature vector, the content feature vector, the Uniform Resource Locators feature vector, the inlink feature vector, the outlink feature vector and the information need feature vector for each content portion on the user path are combined using the content portion position and content portion access weighting. The combined multi-modal vector represents a user profile and can be represented as:

$$\text{User Profile} = \sum_{d=1}^{N} SiPd$$

where Si are the Sessions Weights and Pd are the feature vectors including proximal cue vectors. The multi-modal vector allows different types of information representing the content portions collection to be combined and operated upon using a unified representation.

Figure 8:
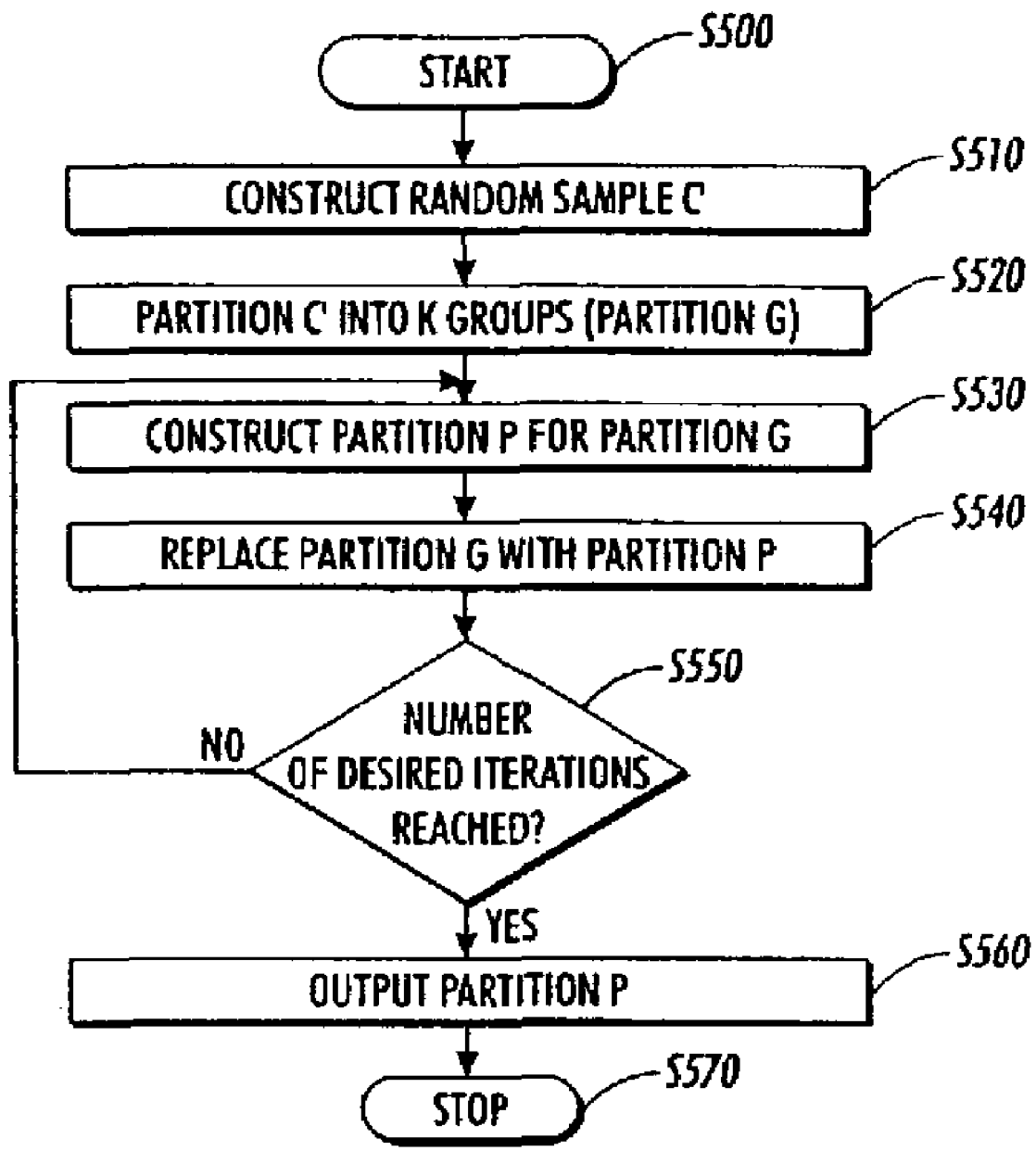
FIG. 8 is a flowchart outlining one exemplary embodiment of a method for Buckshot clustering that may be used in the scattering and gathering process according to this invention.
Figure 9:
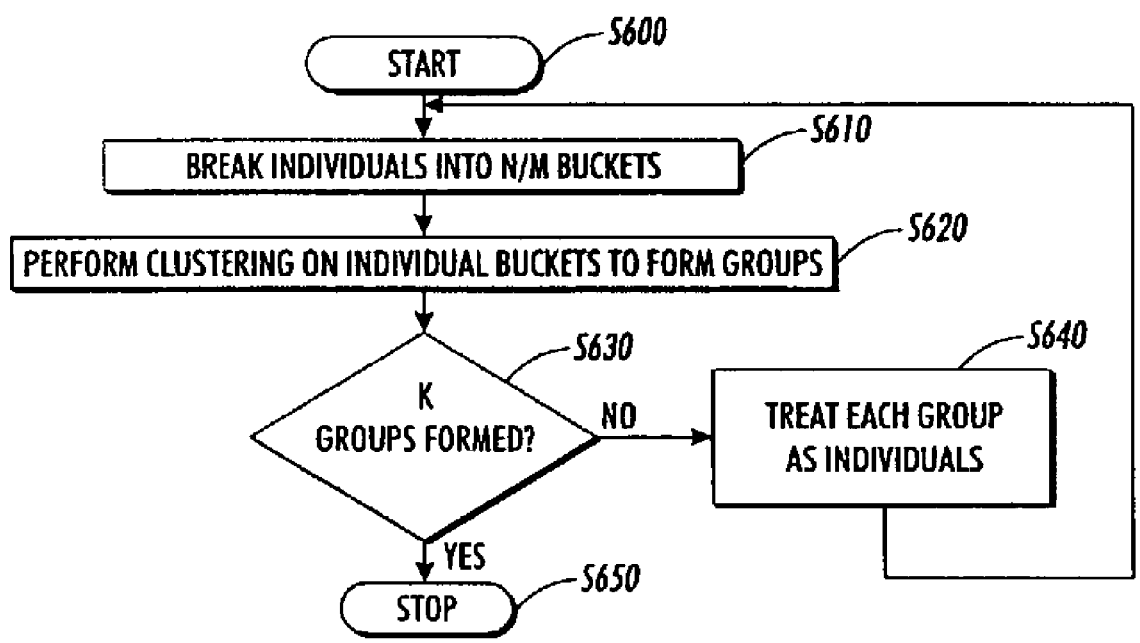
FIG. 9 is a flowchart outlining one exemplary embodiment of a method for Fractionation clustering that may be used in the scattering and gathering according to this invention.

FIGS. 8 and 9 are flowcharts outlining exemplary embodiments of a partitional clustering method that may be used according to the invention. In order to cluster collection of content portions, content portions based on relevant user modeling or user profiles, a pair-wise measure of content portion similarity should be established. Then, one or more clustering methods should be established to partition the content portion collection into clusters of similarity. A popular similarity measure, the cosine measure, computes the cosine of the angle between these two sparse vectors. If both vectors are normalized to unit length, the cosine is generally the inner product of the two vectors. However, other known or later-developed similarity measurement techniques may be used.

The partition clustering methods may be performed on a collection C of content portions based on user modeling or user profiles. For example, a partition clustering method takes, as input, the collection C and an integer parameter k, which is the number of cluster centers, where 0<k≦I C I. The method then assigns each content portion in the collection C to one of the cluster centers to produce a partition P of k content portion groups. Once the partition clustering is completed, the collection C is now prepared for the scattering and gathering process.

FIG. 8 is a flowchart outlining an exemplary embodiment of a Buckshot clustering method that may be used according to this invention. As shown in FIG. 8, in this exemplary embodiment, operation of the method starts in step S500, and continues to step S510, where a random sample C' is constructed from a collection C of size $\sqrt{kN}$, and N=I C I. Then, in step S520, the random sample C' is partitioned into k groups using, for example, truncated group average agglomerative clustering. This partition will be defined as a partition G. Next, in step S530, a partition P of the collection C is constructed by assigning each individual content portion to one of the centers in the partition G. This may be achieved by applying an assign-to-nearest center scattering over the collection C and the k centers of the partition G. Operation then continues to step S540.

In step S540, the partition G is replaced with the partition P. In step S550, a determination is made whether a predetermined number of iterations have been satisfied. If not, operation returns to step S530. Otherwise, operation continues to step S560, where the resultant partition P is output. Then, in step S570, operation of the method terminates.

FIG. 9 is a flowchart outlining one exemplary embodiment of a Fractionation clustering method according to this invention. As shown in FIG. 9, in this exemplary embodiment, operation of the method starts in step S600, and continues to step S610, where content portions in the collection C are treated as individuals and are broken into N/m buckets of a fixed size m, where m>k and k is defined as set forth above. Next, in step S620, clustering is performed on the individual buckets such that the individual content portions in each bucket form into groups, where the number of individuals verses the number of groups in the bucket is reduced by a desired factor p. Then, in step S630, a determination is made whether k groups have formed. If not, operation continues to step S640 where the formed groups are treated as individuals. Operation then returns to step S610. Otherwise, in step S630, the operation continues to step S650, where operation of the method terminates.

Further details of Buckshot and Fractionation clustering methods and the scatter and gather process may be found in the incorporated 778 patent. It should be appreciated that the Buckshot clustering method and the Fractionation clustering method are examples only, and any other currently known or later-developed clustering method may be used.

The Buckshot clustering method sacrifices some precision in that some content portions may be misclassified in favor of speed. The Fractionation clustering method, on the other hand, attempts to find a very high precision partition through exhaustive refinement. Thus, in various exemplary embodiments, the Buckshot clustering method may be appropriate for the on-the fly reclustering required by inner iterations of the scatter and gather technique, while Fractionation clustering method may be used, for example, to establish the primary partitioning of the entire collection C, which is displayed in the first iteration of the scatter and gather technique.

Figure 10:
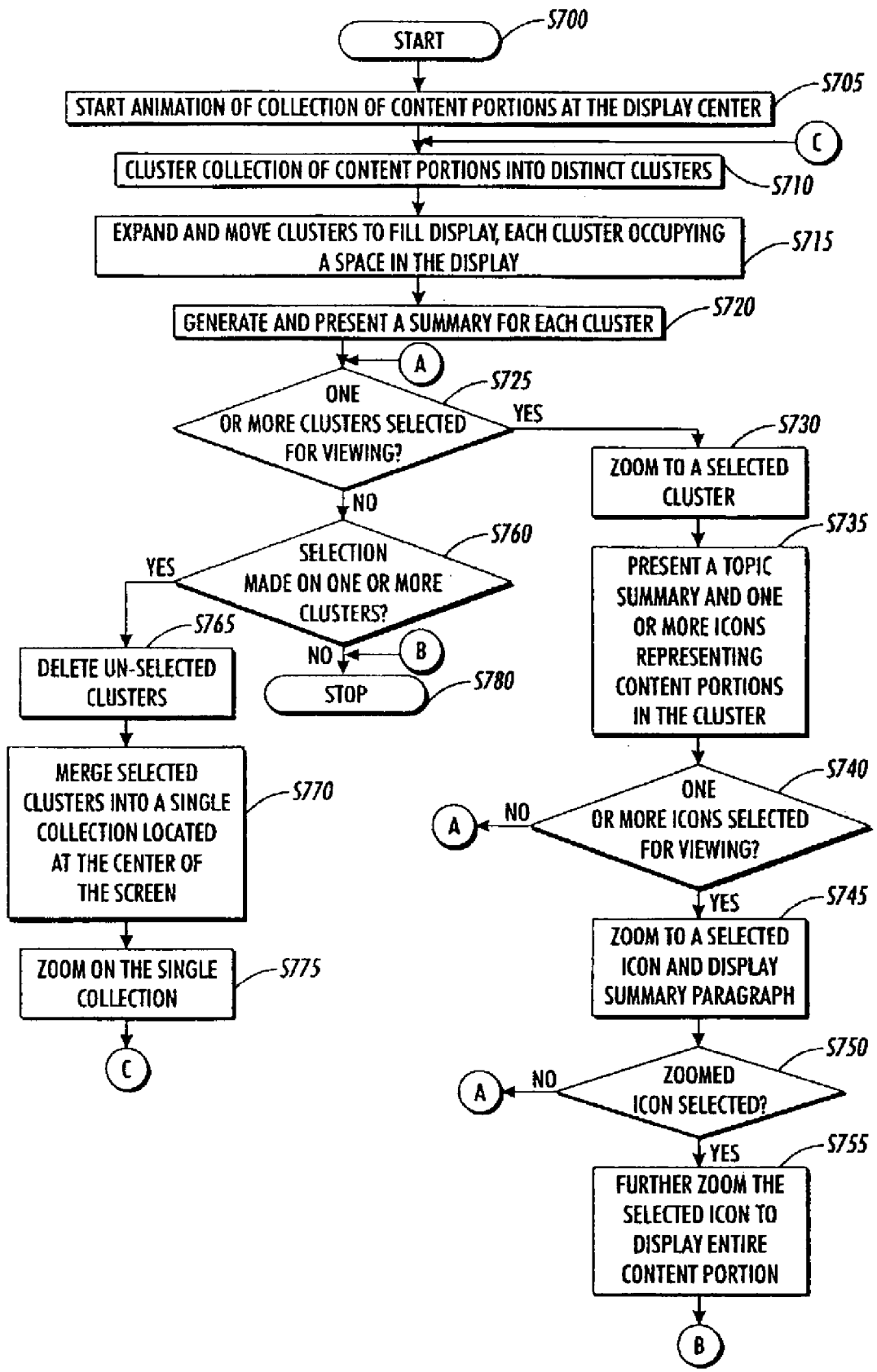
FIG. 10 is a flowchart of an exemplary embodiment of a method for accessing a collection of content portions according to this invention.

FIG. 10 is a flowchart outlining one exemplary embodiment of a method for displaying a collection of content portions according to this invention. As shown in FIG. 10, in this exemplary embodiment, operation of the method starts in step S700, and continues to step 5705, where an animation representing the collection of content portions starts at the center of a display device, such as a monitor. Then, in step S710, the collection of content portions begin to form into distinct clusters. Next, in step S715, the clusters start to expand and fill the entire display, each cluster occupying a portion of the display. Operation then continues to step S720.

In step S720, which may be performed in conjunction with step S715, each cluster is represented with a summary, which may be keywords, topic sentence summary and/or images. In various exemplary embodiments, the selected images from a given cluster may form a collage. In various exemplary embodiments, clusters may be distinguished by using color, highlight and/or the like. For example, color may be used to show which cluster has a high textual content or which cluster has content portions from authoritative sources, among others. Next, in step S725, a determination is made whether one or more clusters have been selected by the user for viewing. If one or more clusters have been selected for viewing, operation continues to step S730. Otherwise operation jumps to step S760.

In step S730, one or more clusters of the one or selected clusters are zoomed in on so those one or more clusters are displayed. Then, in step S735, a topic summary is displayed with the zoomed cluster(s), where the cluster(s) are further represented by one or more icons that represents the content portions of the cluster(s). Next, in step S740, a determination is made whether one or more icons have been selected. If no icons are selected in step S740, operation returns to step S725. Otherwise, if one or more icons have been selected in step S740, operation continues to step S745.

In step S745, a selected icon is zoomed to enlarge the icon. A paragraph summary may be displayed that summarizes the icon. Next, in step S750, a determination is made whether the zoomed icon has been selected. If the icon has not been selected, then operation returns to step S725. Otherwise, if the zoomed icon has been selected, then operation continues to step S755, where further zooming occurs to display the entire content portion on the display. Operation jumps to step S780.

In contrast to steps S730–S755, in step S760, a determination is made whether one or more clusters have been selected. If one or more clusters have been selected, then the operation continues to step S765, where the un-selected clusters are deleted. Next, in step S770, the selected clusters merge to the center of the display, where the selected clusters form a single sub-collection. Next, in step S775, the sub-collection is enlarged on the display. Operation then returns to step S710. In contrast to steps S765–S775, if in step S760, no clusters are selected, operation continues to step S780, where operation of the method terminates.

Figure 11:
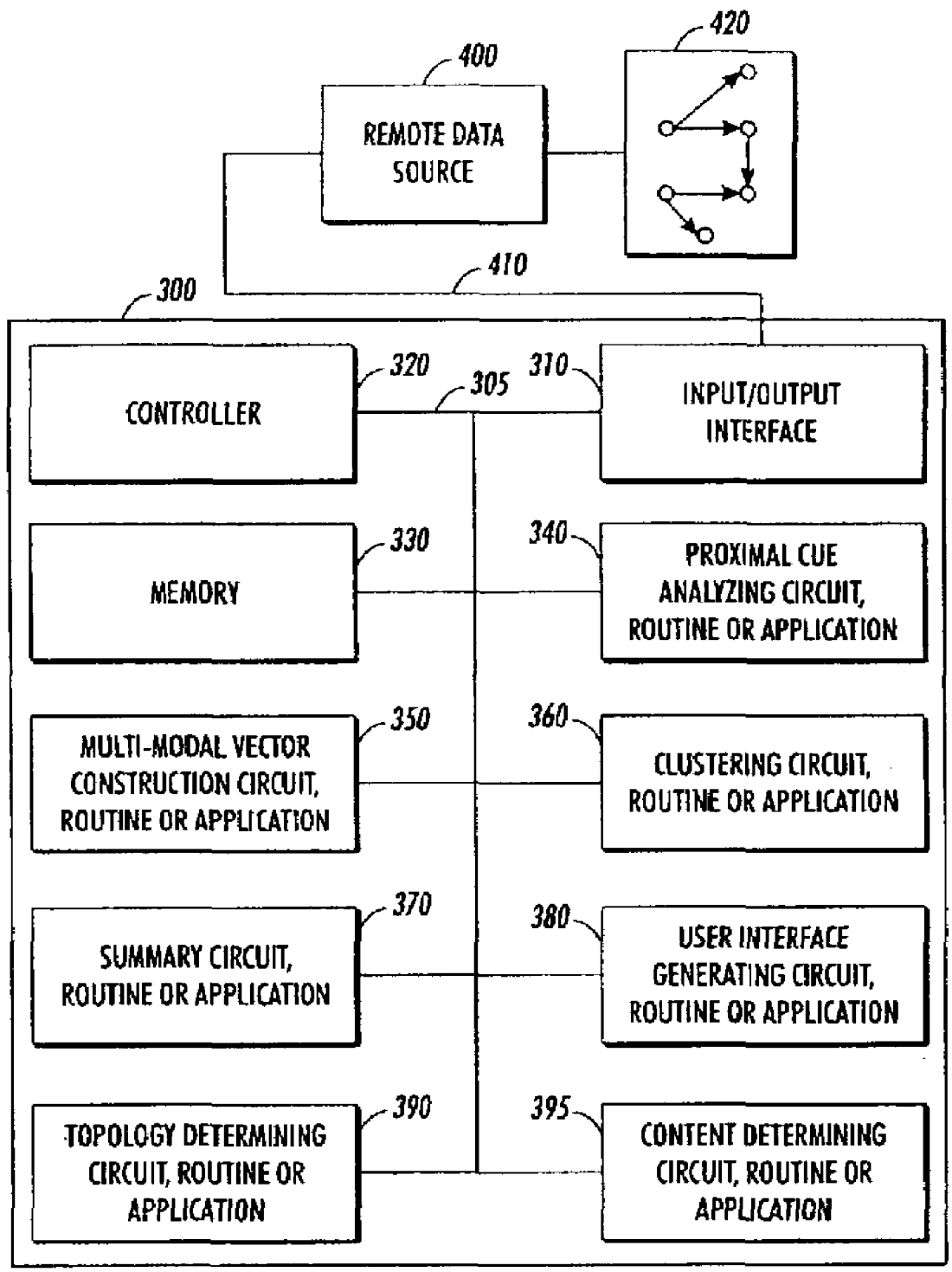
FIG. 11 schematically illustrates one exemplary embodiment of a data processing system according to this invention.

FIG. 11 shows an exemplary embodiment of a system 300 that provides an interface to collection of content portions according to this invention. As shown in FIG. 11, in this exemplary embodiment, the system 300 includes an input/output interface 310, a controller 320, a memory 330, a proximal cue analyzing circuit, routine or application 340, a multi-modal features vector construction circuit, routine or application 350, a clustering circuit, routine or application 360, a summary generating circuit, routine or application 370, and an user interface generating circuit, routine or application 380, interconnected by one or more control and/or data busses and/or application programming interfaces 305. As shown in FIG. 11, the system 300 is connected via a communication link 410 to a remote data source 400. In various exemplary embodiments, the remote data source can be a document collection server or web server. The remote data source 400 provides access to content portions in a content portion collection 420. In various exemplary embodiments, the content portions can be documents or web pages, while the content portions collection can be a document collection and/or one or more websites.

The system 300 may store, in the memory 330, the connections or links between each content portion of the content portion collection 420, as well as the content elements of each of the retrieved content portions. In various exemplary embodiments, the system 300 can include a topology determining circuit, routine or application 390 and a content determining circuit, routine or application 395. The controller 320 activates the topology determining circuit, routine or application 390 to retrieve each content portion of the document collection 420 through the remote data source 400 over the communications link 410 and the input/output interface 310. The retrieved content portions are analyzed to determine the connections or links between each content portion of the content portion collection 420. The topology information is then stored in a topology storage portion of the memory 330. It should be apparent that the topology storage portion can include a topology storage data structure, such as, for example, a matrix structure, an adjacency list and/or any other known or later-developed data structure usable to store information about the connection or link information between content portions.

The content determining circuit, routine or application 395 determines the content elements of each of the retrieved content portions. For example, in one exemplary embodiment, the words in each content portion and the frequency of occurrence of the words is determined by the content determining circuit, routine or application 395. It will be apparent that the content determining circuit, routine or application 395 may be activated as each content portion is retrieved by the topology determining circuit, routine or application 390, or may be activated after the topology of the content portions collection has already been determined.

The proximal cue analyzing circuit, routine or application 340 analyzes each link or connection that appears on a content portion, including the content elements of the links or connectors for proximal cues that convey information to a user. The multi-modal features vector construction circuit, routine or application 350 determines information obtained from user sessions and content portions, and further receives and determines the proximal cues related to the content portions from the proximal cue analyzing circuit, routine or application 340 to generate one or more multi-modal features vectors that may represent the corresponding content portion. The clustering circuit, routine or application 360 analyzes the multi-modal feature vectors for shared similarity and clusters the multi-modal feature vectors based on the shared similarity.

It should be apparent that the proximal cue analyzing circuit, routine or application 340 may be activated as each content portion is retrieved by the topology determining circuit, routine or application 370 or may be activated after the topology of the content portion collection has already been determined. The proximal cue analyzing circuit, routine or application 340 breaks down the link or connection and surrounding content elements, including those contents in distal but connected content portions, into constituent words. Entries reflecting the presence of the proximal cues are then stored in a proximal cue portion of the memory 330.

In various exemplary embodiments, the summary generating circuit, routine or application 370 constructs a summary for each cluster. In various exemplary embodiments, the summary generating circuit, routine or application 370 can be implemented using a commercially available summarization engine. Selected images from a cluster may be also pieced together to form a collage. These features are further described in the incorporated Helfman reference.

In various exemplary embodiments, the user interface generating circuit, routine or application 380 provides a user with a user interface to the system 300. For example, the user interface allows the user to visualize the scattering and gathering process. Further, the user interface enables users to seamlessly zoom from a high-level map of the clustered collection of content portions to a specific detail of the particular content portion. The user interface provides interaction with the system 300 that enables users to browse and move through the collection of content portions at different granularity of details of the clusters. Stately differently, the user is provided with a zooming effect that provides a global information of the collections of content portions to specific details of content portions in each cluster and further, the specific details of the content portions itself.

Figure 12:
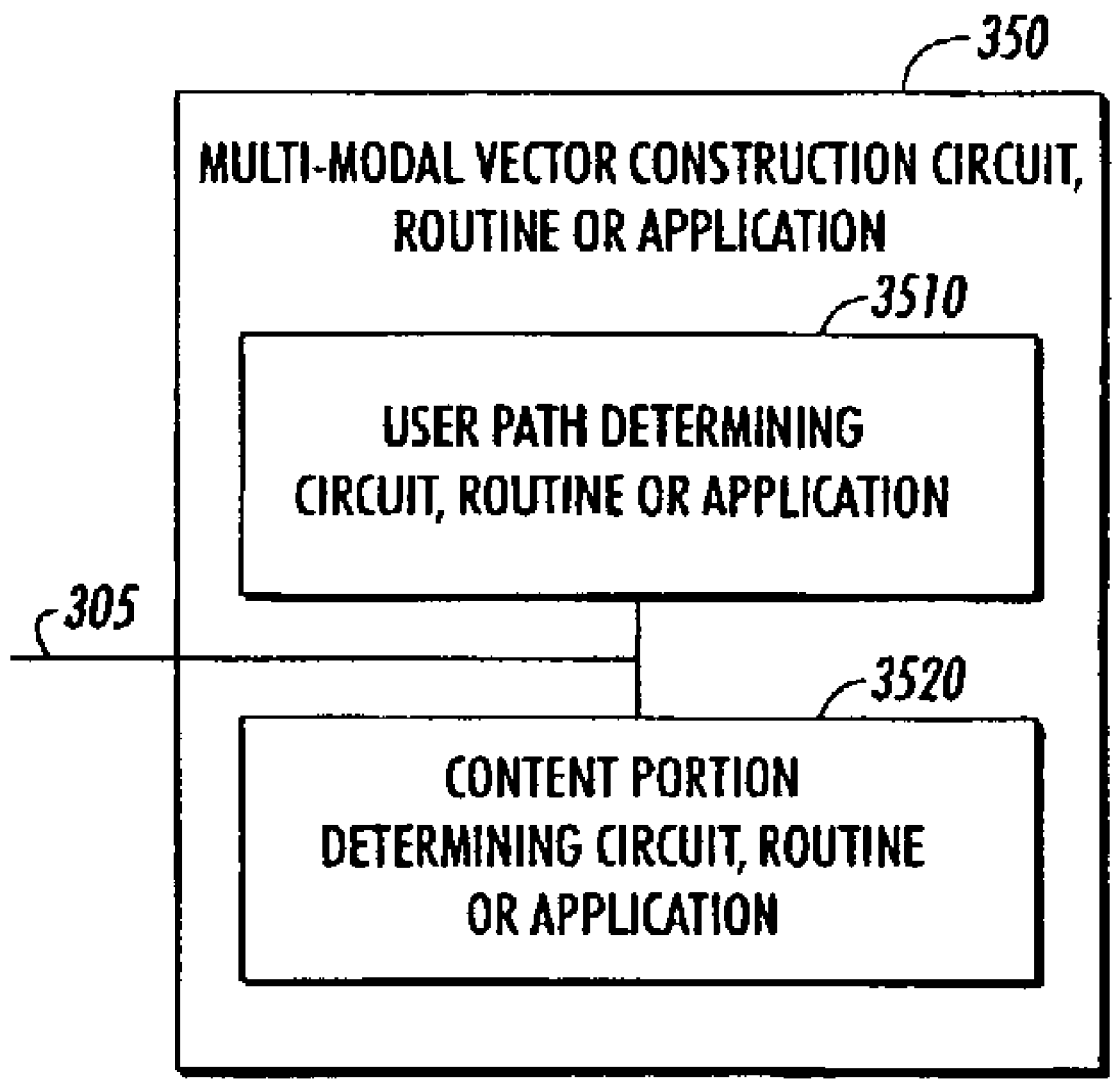
FIG. 12 is a block diagram that shows in greater detail one exemplary embodiment of the multi-modal vector construction circuit, routine or application of FIG. 11 according to this invention.

FIG. 12 shows in greater detail one exemplary embodiment of the multi-modal features vector construction circuit, routine or application 350 according to the invention. As shown in FIG. 12, in this exemplary embodiment, the multi-modal features vector construction circuit, routine or application 350 includes a user path determining circuit, routine or application 3510 and a content portion determining circuit, routine or application 3520. The user path determining circuit, routine or application 3510 determines the one or more user paths through the collection of content portions. The content portion determining circuit, routine or application 3520 determines the sequence of content portions accessed by a user in the one or more user paths.

Figure 13:
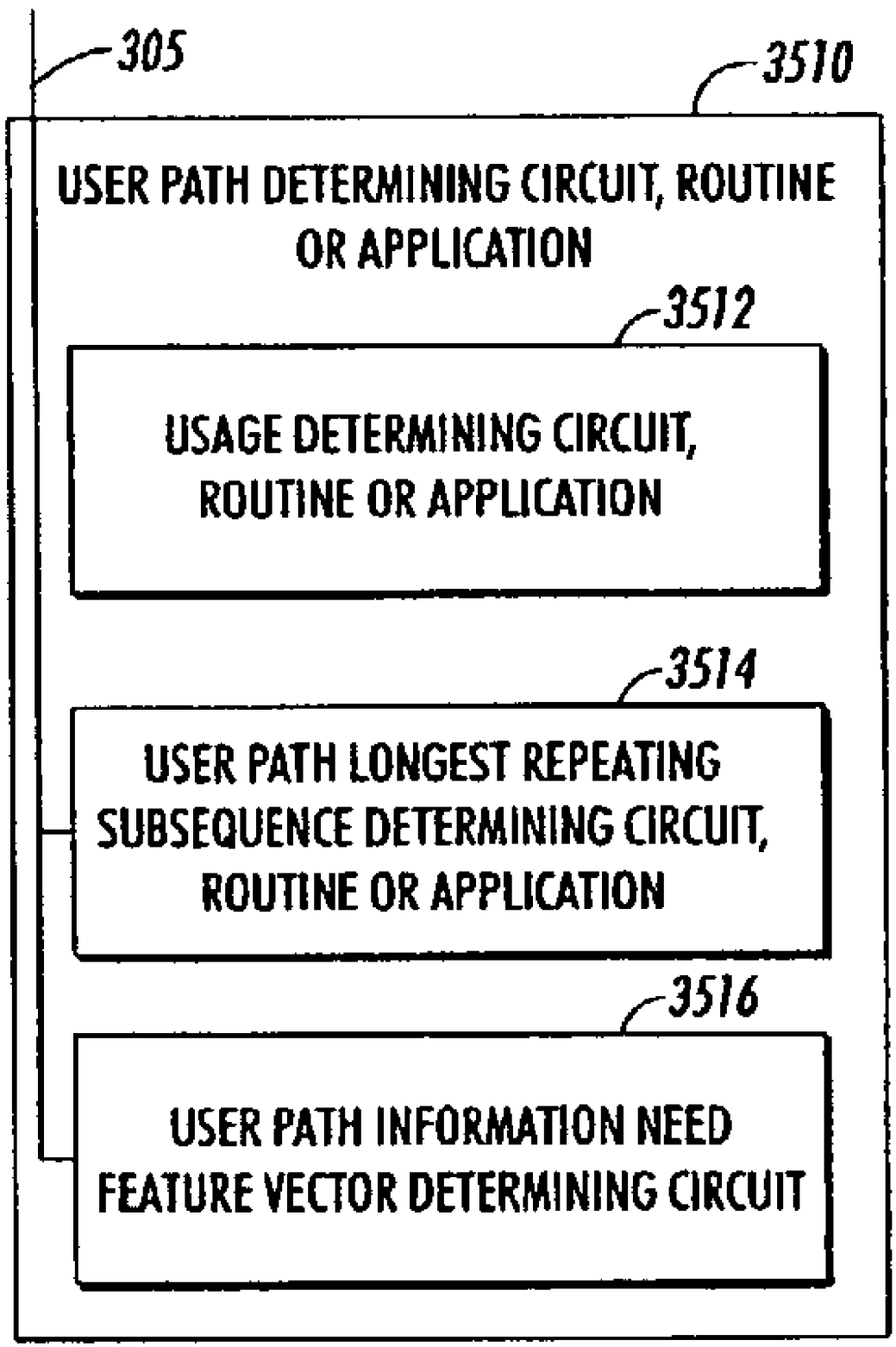
FIG. 13 is a block diagram that shows in greater detail one exemplary embodiment of the user path determining circuit, routine or application of FIG. 12 according to this invention.

FIG. 13 shows in greater detail one exemplary embodiment of the user path determining circuit, routine or application 3510 according to this invention. As shown in FIG. 13, in this exemplary embodiment, the user path determining circuit, routine or application 3510 includes a usage determining circuit, routine or application 3512, a user path longest repeating subsequence determining circuit, routine or application 3514, and a user path information need feature vector determining circuit, routine or application 3516.

The usage determining circuit, routine or application 3512 determines the user path traversals of the content portion collection 420, for example, by accessing information on user activity in the content portion collection 420. The user paths are transferred to the user path longest repeating subsequence determining circuit, routine or application 3514. The longest repeating subsequence is the longest user traversal of a set of connected content portions. Determining the longest repeating subsequence filters out less relevant or less important information to and in identifying relevant user paths from the user path information. The user path longest repeating subsequence determining circuit, routine or application 3514 identifies user paths that exceed a threshold level and determines which identified user paths are the longest subsequences. These identified paths are then stored in the memory 330 as determined usage information.

The user path information need feature vector determining circuit, routine or application 3516 is activated to identify the information need keywords associated with a user path using the techniques described in co-pending U.S. patent application Ser. No. 09/540,063, which is incorporated herein by reference in its entirety. The user path information need feature vector determining circuit, routine or application 3516 stores the information need keyword information in the memory 330 indicating the most relevant keywords for the user path.

Figure 14:
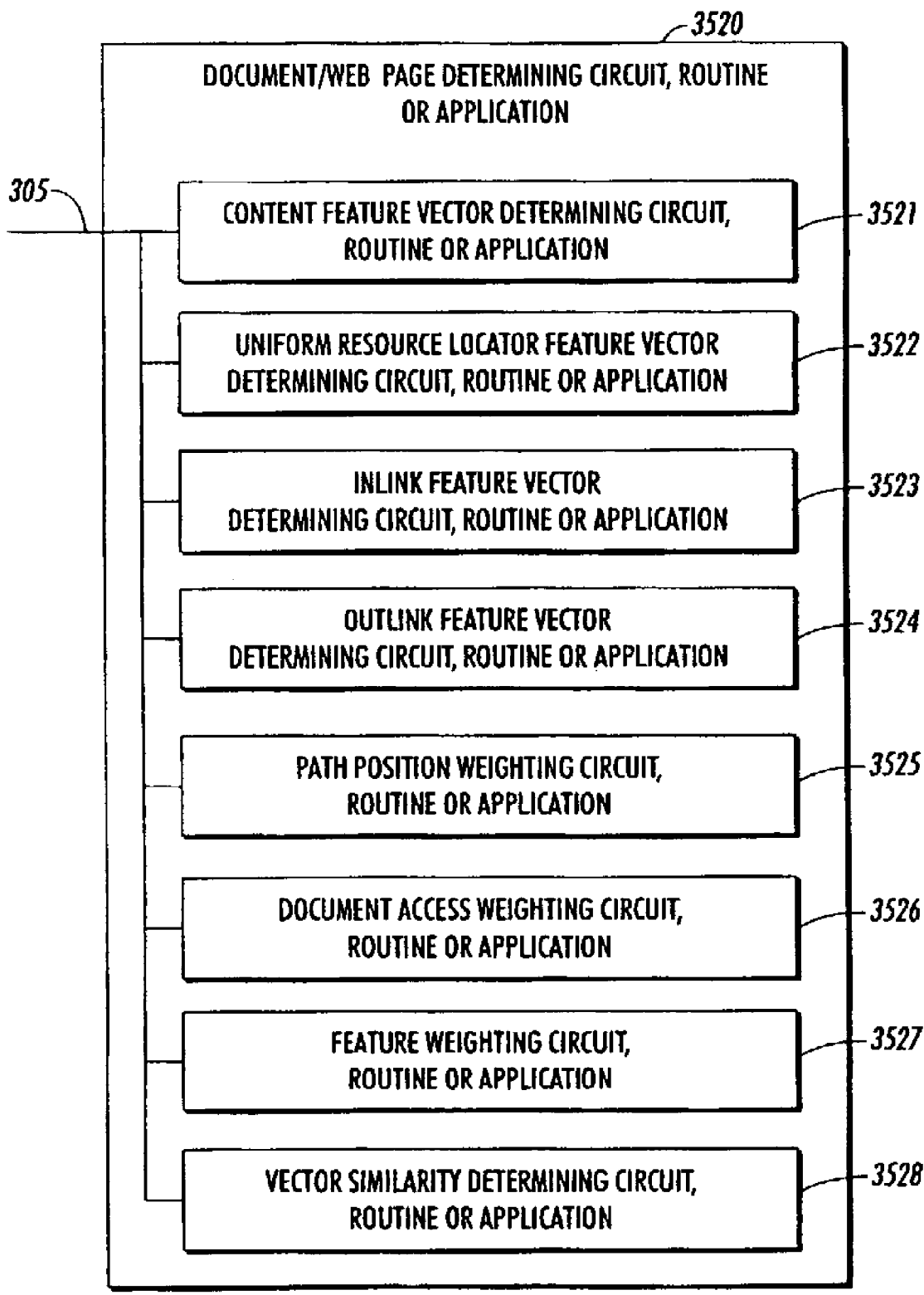

FIG. 14 shows in greater detail one exemplary embodiment of the content portion determining circuit, routine or application 3520 according to this invention. In this exemplary embodiment, the content portion determining circuit, routine or application 3520 includes a content feature vector determining circuit, routine or application 3521, a uniform resource locator feature vector determining circuit, routine or application 3322, an inlink vector determining circuit, routine or application 3523, an outlink vector determining circuit, routine or application 3524, a path position weighing circuit, routine or application 3525, a content portion access weighting circuit, routine or application 3526, a feature weighting circuit, routine or application 3527 and a vector similarity determining circuit, routine or application 3528.

The content feature vector determining circuit, routine or application 3521 breaks down each retrieved content portion of the content portion collection 420 into constituent words. The uniform resource locator feature vector determining circuit, routine or application 3522 determines the features of the uniform resource locators that appear in each content portion.

The inlink vector determining circuit, routine or application 3523 determines the inlinks or inward uniform resource locators that refer to the current content portion in the content portion collection 420. For example, the topology matrix of the content portion collection or web site 420 may be examined to determine which content portions contain connections or links to the current content portion. Since uniform resource locators may refer to a specific subportion within a content portion, each of the referring content portions is analyzed to determine the uniform resource locator including any subportion information. Also, since the inlink may reference a relative uniform resource locator instead of a full path, the inlink feature vector determining circuit, routine or application 3523 determines the full path of the uniform resource locator so that a fully normalized weighting of the uniform resource locator may be determined. The inlink vector determining circuit, routine or application 3523 then determines an inlink feature vector from the relevant weighting of the uniform resource locators.

The outlink vector determining circuit, routine or application 3524 determines the outlinks or outward uniform resource locators that are referred to by the current content portion in the content portion collection 420. It will be apparent that the outlink feature vector determining circuit, routine or application 3524 may be activated before, after or at the same time as the content feature vector determining circuit, routine or application, routine or application 3521 is activated.

The path position weighting circuit, routine or application 3525 determines the relative weighting to associate with each content portion in the user path. For example, in various exemplary embodiments, the path position weighting circuit, routine or application 3525 assigns a weighting multiple to the content portion that increases from the first content portion accessed to the last content portion accessed. This type of weighting provides a higher weighting to the most recently accessed information on the user path. However, it will be apparent that any type of path position weighting may be used by the path position weighting circuit, routine or application 3525.

The content portion access weighting circuit, routine or application 3526 determines how frequently the user path content portion has been accessed based on the determined usage information stored in the memory 330. It will be apparent that any type of access weighting may be used by content portion access weighting circuit, routine or application 3526.

The feature weighting circuit, routine or application 3527 allows the user to select a weighting for the proximal cue feature vector, the content feature vector, the uniform resource locator feature vector, the inlink feature vector, the outlink feature vector and/or the user path information need feature vector. Any method of selecting a weighting may be used, including, but not limited to, a drop down dialog box to select an entry, a text entry box or any other known or later-developed technique for making selections.

The vector similarity determining circuit, routine or application 3528 selects the similarity function that is used to define similarity between any of the vectors. In various exemplary embodiments, the similarity function is a combination of the similarity functions for the proximal cue feature vector, the content feature vector, the uniform resource locator feature vector, the inlink feature vector, the outlink feature vector and the information need feature vector after the feature weights have been applied. In various embodiments, any or all of bases for determining similarity between the proximal cue feature vector, the content feature vector, the uniform resource locator feature vector, the inlink feature vector, the outlink feature vector and the information need feature vector may be changed. As discussed above, any technique for selecting a similarity function may be used, including, but not limited to, drop down dialog boxes, text entry pop-up boxes or any other known or later-developed technique.

Once the user path determining circuit, routine or application 3510 determines user activity in the content portion collection and the content portion determining circuit, routine or application 3520 determines the content portion collection content, the multi-modal features vector construction circuit, routine or application 350 builds a multi-modal vector for each content portion.

Figure 15:
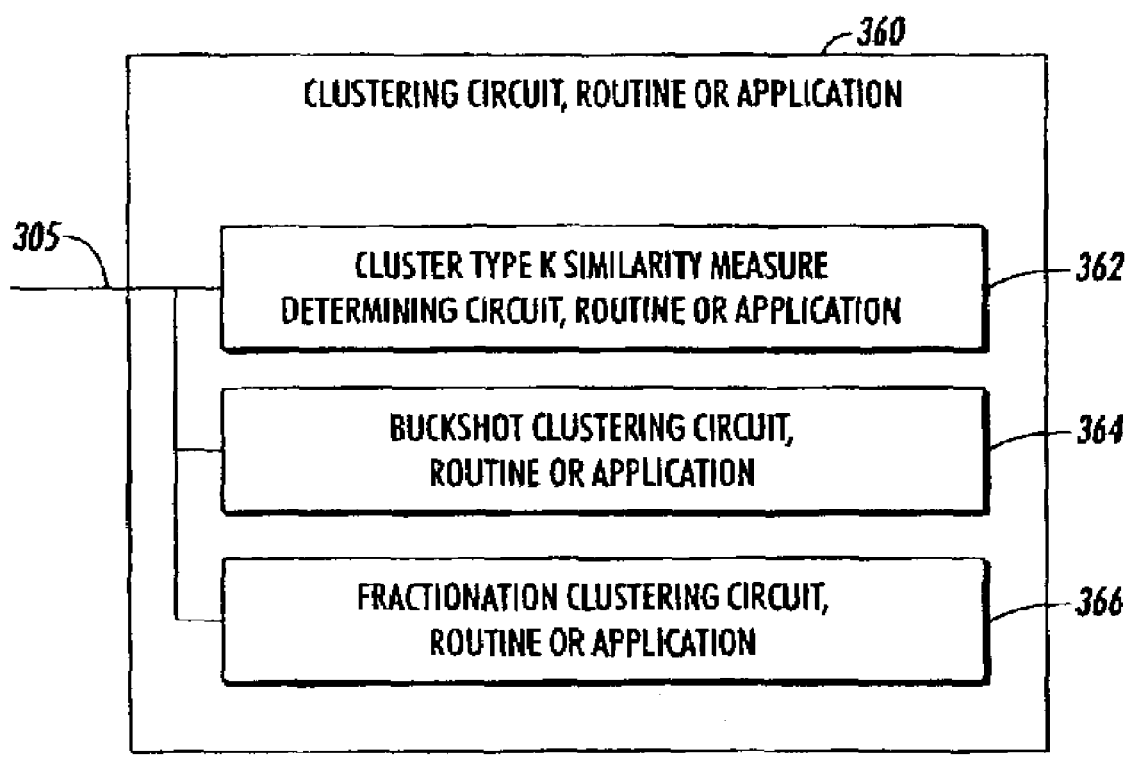
FIG. 15 is a block diagram that shows one exemplary embodiment of the clustering circuit, routine or application of FIG. 11 according to the invention.

FIG. 15 shows in greater detail one exemplary embodiment of a clustering circuit, routine or application 360 according to the invention. As shown in FIG. 15, in this exemplary embodiment, the clustering circuit, routine or application 360 includes one or more of a cluster type and similarity measure determining circuit, routine or application 362, a Buckshot clustering circuit, routine or application 364 and/or a Fractionation clustering circuit, routine or application 366.

The cluster type and similarity measure determining circuit, routine or application 362 determines what type of multi-modal clustering has been selected and determines the required measure of similarity between vectors. For example, a cosine measure may be used that computes the cosine of the angle between two vectors. If the two vectors are normalized to unit length, the cosine would be the inner product of the two vectors. However, it will be appreciated that other known or later-developed similarity measurement technique may be used.

If the Buckshot clustering is selected, the Buckshot clustering circuit, routine or application 364 is activated. Otherwise, if the Fractionation clustering is selected, the Fractionation clustering circuit, routine or application 366 is activated. Both the Buckshot clustering circuit, routine or application 364 and the Fractionation clustering circuit, routine or application 366 may be designed to find the initial centers of the clusters. When the initial centers are determined, group average agglomerative clustering may be used to cluster the multi-modal vectors to the various centers based on similarity. The Buckshot clustering circuit, routine or application 364 clusters to a random sample to find centers. The Fractionation clustering circuit, routine or application, on the other hand, uses successive application of clustering over a fixed size groups to find centers.

In the various exemplary embodiments outlined above, the system 300 for clustering user sessions using multi-modal information and proximal information can be implemented using a programmed general purpose computer. However, the system 300 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIGS. 3–10 can be used to implement the system 300.

Each of the circuits, routines or applications of the system 300 can be implemented as portions of a suitably programmed general purpose computer. Alternatively, each of the circuits, routines or applications of the system 300 outlined above can be implemented as physically distinct hardware circuits within an ASIC, or using a FPGA, a PLD, a PLA or a PAL, or using discrete logic elements or discrete circuit elements. The particular form each of the circuits, routines or applications of the system 300 will take is a design choice and will be apparent to those skilled in the art.

Moreover, the system 300 and/or each of the various circuits, routines or applications discussed above can each be implemented as software routines, managers or objects executing on a programmed general purpose computer, a special purpose computer, a microprocessor or the like. In this case, the system 300 and/or each of the various circuits, routines or applications discussed above can each be implemented as one or more routines embedded in the communications network, as a resource residing on a server, or the like. The system 300 and the various circuit, routine or applications discussed above can also be implemented by physically incorporating the system 300 into a software and/or hardware system, such as the hardware and software systems of a document server, web server or electronic library server.

As shown in FIG. 11, the memory 330 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication link 410 can be any known or later developed device or system for connecting a communication device to the system 300, including a direct cable connection, a connection over a wide area network or a local area network, a connection over an intranet, a connection over the Internet, or a connection over any other distributed processing network or system. In general, the communication link 410 can be any known or later-developed connection system or structure usable to connect devices and facilitate communication. It should be appreciated that the communication link 410 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A computer implemented method for accessing a collection of content portions, comprising:
   (a) determining multi-modal information for at least one content portion in the collection of content portions;
   (b) determining proximal information for the at least one content portion in the collection of content portions, the proximal information including at least one proximate cue that surrounds a link and/or connection, the proximate cue including a word, text, image and/or sound;
   (c) generating a plurality of centers for clustering content portions of the collection of content portions;
   (d) clustering each content portion in the collection of content portions to a center of the plurality of centers having similar multi-modal information and proximal information;
   (e) retaining content portions of at least one selected cluster;
   (f) purging content portions of each non-selected cluster; and
   (g) wherein, when at least two clusters are selected, merging the selected clusters.

2. The method of claim 1, further comprising:
   determining at least one user path in the collection of content portions;
   determining at least one content portion associated with the user path; and
   using the content portion associated with the user path when clustering each content portion in the collection of content portions to the center having similar multi-modal information and proximal information.

3. The method of claim 1, further comprising:
   generating for each content portion, a vector based on the multi-modal information and the proximal information of the content portion; and
   using the vectors as basis for determining similarity between content portions.

4. The method of claim 1, further comprising generating a summary for at least one generated cluster.

5. The method of claim 1, further comprising generating proximal information based on an image in a content portion.

6. The method of claim 1, further comprises repeating the steps of (c)–(g).

7. A system computer implemented usable to access a collection of content portions, comprising:
   a multi-modal determining circuit, routine or application usable to determine multi-modal information and proximal information for at least one content portion in a collection of content portions, the proximal information includes at least one proximate cue that surrounds a link and/or connection, the proximate cue includes a word, text, image and/or sound; and
   a clustering circuit, routine or application usable to generate a plurality of centers, and to cluster each content portion in the collection of content portions to one of the plurality of centers using the multi-modal information and proximal information of that content portion, wherein the clustering circuit, routine or application retains content portions of at least one selected cluster and purges content portions of each non-selected cluster and merges selected clusters when at least two clusters are selected.

8. The system of claim 7, further comprising an interface usable to display at least one cluster generated by the clustering circuit, routine or application.

9. The system of claim 7, further comprising:
   a user path determining circuit, routine or application that determines at least one user path in the collection of content portions; and a content portion determining circuit, routine or application that determines at least one content portion associated with the user path;

wherein the clustering circuit, routine or application receives the at least one determined content portion from the content determining circuit, routine or application.

10. The system of claim 7, further comprising:
a multi-modal vector construction circuit, routine or application usable to construct, for each content portion, a vector based on the multi-modal information and the proximal information of that content portion; and
a vector similarity determining circuit, routine or application that determines a similarity between content portions based on the constructed vectors.

11. The system of claim 7, further comprising a summary circuit, routine or application usable to generate a summary for at least one generated cluster.

12. The system of claim 7, wherein the clustering circuit repeats generating the plurality of centers, clustering each portion in the collection of content portions to one of the plurality of centers using the multi-module information and proximal information of that content portion, retaining content portion of at least one selected cluster and purging content portion of each non-selected cluster, and merging selected clusters when at least two clusters are selected.

* * * * *

UNITED STATES PATENT AND TRADEMARK OFFICE
CERTIFICATE OF CORRECTION

PATENT NO.         : 7,028,053 B2                                              Page 1 of 1
APPLICATION NO. : 10/248408
DATED              : April 11, 2006
INVENTOR(S)       : Ed H Chi et al.

It is certified that error appears in the above-identified patent and that said Letters Patent is hereby corrected as shown below:

Column 1, line 4, insert as a new paragraph:

This invention was made with Government support under N00014-96-C-0097 awarded by ONR. The Government has certain rights in this invention.

Signed and Sealed this

Thirteenth Day of May, 2008

JON W. DUDAS
*Director of the United States Patent and Trademark Office*